US010803639B2

(12) United States Patent
Antihi et al.

(10) Patent No.: US 10,803,639 B2
(45) Date of Patent: *Oct. 13, 2020

(54) MULTIDIMENSIONAL ARC CHART FOR VISUAL COMPARISON

(71) Applicant: Palantir Technologies Inc., Palo Alto, CA (US)

(72) Inventors: Alexandru Antihi, Palo Alto, CA (US); Ari Gesher, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,689

(22) Filed: Sep. 19, 2019

(65) Prior Publication Data
US 2020/0013204 A1 Jan. 9, 2020

Related U.S. Application Data

(63) Continuation of application No. 15/592,095, filed on May 10, 2017, now Pat. No. 10,475,219.
(Continued)

(51) Int. Cl.
*G06T 11/20* (2006.01)
*G06F 3/0481* (2013.01)
*G06F 3/0484* (2013.01)

(52) U.S. Cl.
CPC ........ *G06T 11/206* (2013.01); *G06F 3/04812* (2013.01); *G06F 3/04842* (2013.01)

(58) Field of Classification Search
None
See application file for complete search history.

(56) References Cited

U.S. PATENT DOCUMENTS 5,632,009 A 5/1997 Rao et al.
6,167,405 A 12/2000 Rosensteel, Jr. et al.
(Continued)

FOREIGN PATENT DOCUMENTS

AU 2014250678 2/2016
EP 1672527 6/2006
(Continued)

OTHER PUBLICATIONS

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
(Continued)

*Primary Examiner* — Michael J Cobb
(74) *Attorney, Agent, or Firm* — Sheppard Mullin Richter & Hampton LLP

(57) ABSTRACT

Systems and methods are provided for presenting multiple dimensions of an entity for visual comparison. Multiple sets of data representing multiple dimensions of a first entity may be accessed. The multiple sets of data may be converted for plotting within a first multidimensional arc chart. The first multidimensional arc chart may be defined by a rounded outer shape. The rounded outer shape may be characterized by an arc length. The first multidimensional arc chart may be divided into multiple sections. Individual sections may include a plot of a dimension of the first entity. Values of the plot may be determined based on corresponding positions along the arc length. An interface that includes the first multidimensional arc chart may be provided.

20 Claims, 6 Drawing Sheets

Related U.S. Application Data

(60) Provisional application No. 62/479,051, filed on Mar. 30, 2017.

(56) References Cited

U.S. PATENT DOCUMENTS

| | | |
|---|---|---|
| 6,456,997 B1 | 9/2002 | Shukla |
| 6,594,672 B1 | 7/2003 | Lampson et al. |
| 6,750,864 B1 | 6/2004 | Anwar |
| 6,980,984 B1 | 12/2005 | Huffman et al. |
| 7,451,397 B2 | 11/2008 | Weber et al. |
| 7,941,321 B2 | 5/2011 | Greenstein et al. |
| 7,971,150 B2 | 6/2011 | Raskutti et al. |
| 8,196,184 B2 | 6/2012 | Amirov et al. |
| 8,290,926 B2 | 10/2012 | Ozzie et al. |
| 8,489,623 B2 | 7/2013 | Jain et al. |
| 8,554,709 B2 | 10/2013 | Goodson et al. |
| 8,595,234 B2 | 11/2013 | Siripuapu et al. |
| 8,639,757 B1 | 1/2014 | Zang et al. |
| 8,676,857 B1 | 3/2014 | Adams et al. |
| 8,787,939 B2 | 7/2014 | Papakipos et al. |
| 8,812,960 B1 | 8/2014 | Sun et al. |
| 9,069,842 B2 | 6/2015 | Melby |
| 9,116,975 B2 | 8/2015 | Shankar et al. |
| 9,146,954 B1 | 9/2015 | Boe et al. |
| 9,229,952 B1 | 1/2016 | Meacham et al. |
| 9,990,747 B1 | 6/2018 | Bhat |
| 2002/0095658 A1 | 7/2002 | Shulman |
| 2003/0036848 A1 | 2/2003 | Sheha et al. |
| 2003/0172014 A1 | 9/2003 | Quackenbush et al. |
| 2003/0229848 A1 | 12/2003 | Arend et al. |
| 2004/0032432 A1 | 2/2004 | Baynger |
| 2004/0111410 A1 | 6/2004 | Burgoon et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2005/0065811 A1 | 3/2005 | Chu et al. |
| 2005/0078858 A1 | 4/2005 | Yao et al. |
| 2005/0154628 A1 | 7/2005 | Eckart et al. |
| 2005/0154769 A1 | 7/2005 | Eckart et al. |
| 2006/0074881 A1 | 4/2006 | Vembu et al. |
| 2006/0184889 A1 | 8/2006 | Molander |
| 2006/0209085 A1 | 9/2006 | Wong et al. |
| 2006/0242040 A1 | 10/2006 | Rader |
| 2007/0005477 A1 | 1/2007 | McAtamney |
| 2007/0150369 A1 | 6/2007 | Zivin |
| 2007/0192265 A1 | 8/2007 | Chopin et al. |
| 2007/0208736 A1 | 9/2007 | Tanigawa et al. |
| 2008/0040275 A1 | 2/2008 | Paulsen et al. |
| 2008/0162616 A1 | 7/2008 | Gross et al. |
| 2008/0243710 A1 | 10/2008 | Boris |
| 2008/0249983 A1 | 10/2008 | Meisels et al. |
| 2009/0055251 A1 | 2/2009 | Shah et al. |
| 2009/0150854 A1 | 6/2009 | Elaasar et al. |
| 2009/0192957 A1 | 7/2009 | Subramanian et al. |
| 2009/0327208 A1 | 12/2009 | Bittner et al. |
| 2010/0030722 A1 | 2/2010 | Goodson et al. |
| 2010/0114887 A1 | 5/2010 | Conway et al. |
| 2010/0144310 A1 | 6/2010 | Bedingfield, Sr. |
| 2010/0228812 A1 | 9/2010 | Uomini |
| 2010/0306029 A1 | 12/2010 | Jolley |
| 2010/0325526 A1 | 12/2010 | Ellis et al. |
| 2011/0004498 A1 | 1/2011 | Readshaw |
| 2011/0029526 A1 | 2/2011 | Knight et al. |
| 2011/0078055 A1 | 3/2011 | Faribault et al. |
| 2011/0115795 A1 | 5/2011 | Koch |
| 2011/0131547 A1 | 6/2011 | Elaasar |
| 2011/0161137 A1 | 6/2011 | Ubalde et al. |
| 2011/0173032 A1 | 7/2011 | Payne et al. |
| 2011/0181598 A1 | 7/2011 | O'Neall et al. |
| 2011/0219321 A1 | 9/2011 | Gonzalez et al. |
| 2011/0258158 A1 | 10/2011 | Resende et al. |
| 2011/0289407 A1 | 11/2011 | Naik et al. |
| 2011/0289420 A1 | 11/2011 | Morioka et al. |
| 2012/0004904 A1 | 1/2012 | Shin et al. |
| 2012/0036013 A1 | 2/2012 | Neuhaus et al. |
| 2012/0075324 A1 | 3/2012 | Cardno et al. |
| 2012/0116828 A1 | 5/2012 | Shannon |
| 2012/0117082 A1 | 5/2012 | Koperda et al. |
| 2012/0154403 A1* | 6/2012 | Mital ............... G06T 11/206 |
| | | 345/440 |
| 2012/0170847 A1 | 7/2012 | Tsukidate |
| 2012/0191432 A1 | 7/2012 | Khataniar |
| 2012/0197651 A1 | 8/2012 | Robinson et al. |
| 2012/0203708 A1 | 8/2012 | Psota et al. |
| 2012/0221553 A1 | 8/2012 | Wittmer et al. |
| 2012/0245976 A1 | 9/2012 | Kumar et al. |
| 2012/0296907 A1 | 11/2012 | Long et al. |
| 2013/0006916 A1 | 1/2013 | McBride et al. |
| 2013/0046635 A1 | 2/2013 | Grigg et al. |
| 2013/0050217 A1 | 2/2013 | Armitage |
| 2013/0073454 A1 | 3/2013 | Busch |
| 2013/0110822 A1 | 5/2013 | Ikeda et al. |
| 2013/0117011 A1 | 5/2013 | Ahmed et al. |
| 2013/0151148 A1 | 6/2013 | Parundekar et al. |
| 2013/0157234 A1 | 6/2013 | Gulli et al. |
| 2013/0267207 A1 | 10/2013 | Hao et al. |
| 2013/0311375 A1 | 11/2013 | Priebatsch |
| 2014/0067611 A1 | 3/2014 | Adachi et al. |
| 2014/0095273 A1 | 4/2014 | Tang et al. |
| 2014/0108068 A1 | 4/2014 | Williams |
| 2014/0129261 A1 | 5/2014 | Bothwell et al. |
| 2014/0156527 A1 | 6/2014 | Grigg et al. |
| 2014/0258246 A1 | 9/2014 | Lo Faro et al. |
| 2014/0310266 A1 | 10/2014 | Greenfield |
| 2014/0316911 A1 | 10/2014 | Gross |
| 2014/0351070 A1 | 11/2014 | Christner et al. |
| 2014/0354648 A1* | 12/2014 | Bak ............... G06T 11/206 |
| | | 345/440 |
| 2014/0372446 A1 | 12/2014 | Bell |
| 2015/0019394 A1 | 1/2015 | Unser et al. |
| 2015/0040052 A1 | 2/2015 | Noel |
| 2015/0051462 A1 | 2/2015 | Olsen |
| 2015/0073929 A1 | 3/2015 | Psota et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0317807 A1* | 11/2015 | Bartley ............... G06T 11/206 |
| | | 345/419 |
| 2015/0324868 A1 | 11/2015 | Kaftan et al. |
| 2015/0347903 A1 | 12/2015 | Saxena et al. |
| 2015/0378996 A1 | 12/2015 | Kesin et al. |
| 2016/0004667 A1 | 1/2016 | Chakerian et al. |
| 2016/0034545 A1 | 2/2016 | Shankar et al. |
| 2016/0092403 A1* | 3/2016 | McElwee ............... G06T 11/206 |
| | | 715/201 |
| 2016/0098173 A1 | 4/2016 | Slawinski et al. |
| 2016/0103592 A1 | 4/2016 | Prophete |
| 2016/0217600 A1* | 7/2016 | Ni ............... G06T 11/001 |
| 2017/0228899 A1 | 8/2017 | Witriol |
| 2018/0084024 A1 | 3/2018 | Xie |
| 2019/0121826 A1* | 4/2019 | LeVell ............... G06F 3/04845 |

FOREIGN PATENT DOCUMENTS

| | | |
|---|---|---|
| EP | 2863326 | 4/2015 |
| EP | 2884439 | 6/2015 |
| EP | 2884440 | 6/2015 |
| WO | WO 2002/065353 | 8/2002 |
| WO | WO 2010/098958 | 9/2010 |

OTHER PUBLICATIONS

Bluttman et al., "Excel Formulas and Functions for Dummies," 2005, Wiley Publishing, Inc., pp. 280, 284-286.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

(56) References Cited

OTHER PUBLICATIONS

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Jelen, Bill, "Excel 2013 in Depth, Video Enhanced Edition," Jan. 25, 2013.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Notice of Allowance for U.S. Appl. No. 13/247,987 dated Mar. 17, 2016.
Notice of Allowance for U.S. Appl. No. 14/320,236 dated Jun. 29, 2016.
Notice of Allowance for U.S. Appl. No. 14/326,738 dated Nov. 18, 2015.
Notice of Allowance for U.S. Appl. No. 14/504,103 dated May 18, 2015.
Notice of Allowance for U.S. Appl. No. 14/923,364 dated May 6, 2016.
Notice of Allowance for U.S. Appl. No. 14/948,009 dated May 6, 2016.
Official Communication for European Patent Application No. 14189344.6 dated Feb. 20, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 16152984.7 dated Mar. 24, 2016.
Official Communication for New Zealand Patent Application No. 622513 dated Apr. 3, 2014.
Official Communication for U.S. Appl. No. 14/306,138 dated Sep. 23, 2014.
Official Communication for U.S. Appl. No. 14/306,138 dated Feb. 18, 2015.
Official Communication for U.S. Appl. No. 14/306,138 dated May 26, 2015.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Sep. 9, 2014.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Dec. 24, 2015.
Official Communication for U.S. Appl. No. 14/306,147 dated Jun. 3, 2016.
Official Communication for U.S. Appl. No. 14/306,154 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Nov. 16, 2015.
Official Communication for U.S. Appl. No. 14/306,154 dated Feb. 1, 2016.
Official Communication for U.S. Appl. No. 14/306,154 dated Mar. 17, 2016.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/319,765 dated Jun. 16, 2015.
Official Communication for U.S. Appl. No. 14/319,765 dated Sep. 10, 2015.
Official Communication for U.S. Appl. No. 14/319,765 dated Feb. 1, 2016.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/323,935 dated Jun. 22, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/326,738 dated Jul. 31, 2015.
Official Communication for U.S. Appl. No. 14/504,103 dated Feb. 5, 2015.
Official Communication for U.S. Appl. No. 14/504,103 dated Mar. 31, 2015.
Official Communication for U.S. Appl. No. 14/645,304 dated Jan. 25, 2016.
Official Communication for U.S. Appl. No. 14/874,690 dated Dec. 21, 2015.
Official Communication for U.S. Appl. No. 14/874,690 dated Jun. 1, 2016.
Official Communication for U.S. Appl. No. 14/948,009 dated Feb. 25, 2016.
Palantir Technolgies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Psaltis, Andrew G., "Streaming Data—Designing the Real-Time Pipeline," Jan. 16, 2015, vol. MEAP VO3, pp. 0-12.
Vose et al., "Help File for ModelRisk Version 5," 2007, Vose Software, pp. 349-353. [Uploaded in 5 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/

(56) References Cited

OTHER PUBLICATIONS

VAST%20Challenge%202010/challenges/MC1%20-%20Investigations%20into%20Arms%20Dealing/entries/Palantir%20Technologies/ retrieved on Aug. 20, 2015.

* cited by examiner

MULTIDIMENSIONAL ARC CHART FOR VISUAL COMPARISON

CROSS REFERENCE TO RELATED APPLICATIONS

This application is a continuation of U.S. application Ser. No. 15/592,095, filed May 10, 2017, which claims the benefit under 35 U.S.C. § 119(e) of the U.S. Provisional Application No. 62/479,051 filed Mar. 30, 2017, the content of each of which are hereby incorporated by reference in their entirety.

TECHNICAL FIELD

This disclosure relates to approaches for presenting multiple dimensions of one or more entities for visual comparison.

BACKGROUND

Under conventional approaches, comparing multiple parameters of multiple entities may require the use of multiple overlaid line charts that split across different charts. Understanding and analyzing information contained within such charts may be cumbersome and time-consuming.

SUMMARY

Various embodiments of the present disclosure may include systems, methods, and non-transitory computer readable media configured to present multiple dimensions of one or more entities for visual comparison. Multiple sets of data representing multiple dimensions of a first entity may be accessed. The multiple sets of data may be converted for plotting within a first multidimensional arc chart. The first multidimensional arc chart may be defined by a rounded outer shape. The rounded outer shape may be characterized by an arc length. The first multidimensional arc chart may be divided into multiple sections. Individual sections may include a plot of a dimension of the first entity. Values of the plot may be determined based on corresponding positions along the arc length. An interface that includes the first multidimensional arc chart may be provided.

In some embodiments, the rounded outer shape of the first multidimensional arc chart may be a circular shape.

In some embodiments, an inner radius of the first multidimensional arc chart may be changed.

In some embodiments, the multiple sections of the first multidimensional arc chart may include a same vertical axis. In some embodiments, the multiple sections of the first multidimensional arc chart may include different vertical axes.

In some embodiments, positions along the arc length may represent different points in time.

In some embodiments, the first multidimensional arc chart may plot the multiple dimensions of the first entity in real time. In some embodiments, the first multidimensional arc chart may plot the multiple dimensions of the first entity for a range of time.

In some embodiments, the interface may include a second multidimensional arc chart for plotting multiple dimensions of a second entity.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a system can provide an interface that includes one or more multidimensional arc charts. A multidimensional arc chart may plot multiple dimensions of an entity. Multiple dimensions may represent different characteristics or parameters of the entity. The multidimensional arc chart may be defined by a rounded outer shape (e.g., circular shape) and the rounded outer shape may be characterized by an arc length. Positions along the arc length may represent different points in time. The multidimensional arc chart may be divided into multiple sections, and individual sections may include a plot of a dimension of the entity. The values of the plot may be determined based on corresponding positions along the arc length. Multiple sections of the multidimensional arc chart may include a same vertical axis or different vertical axes. The multidimensional arc chart may plot dimensions of the entity in real time and/or for a range of time. The multidimensional arc chart may be changed. For example, the zoom level of the multidimensional arc chart may be changed, visible portions of the multidimensional arc chart may be panned, and/or an inner radius of the multidimensional arc chart may be changed. Responsive to a hover over the multidimensional arc chart, one or more tooltips may be displayed. A tooltip may display timestamp, dimension, value at a given time, instruction to modify the multidimensional arc chart, and/or other information. Multiple multidimensional arc charts may be used as a tool to compare multiple dimensions of multiple entities.

Figure 1:
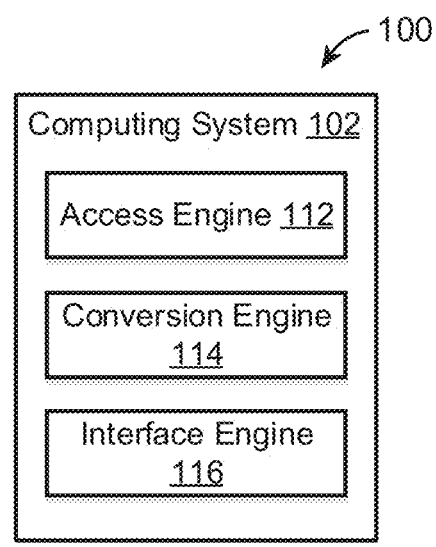
FIG. 1 illustrates an example environment for presenting multiple dimensions of an entity for visual comparison, in accordance with various embodiments.

FIG. 1 illustrates an example environment 100 for presenting multiple dimensions of an entity for visual comparison, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include an access engine 112, a conversion engine 114, an interface engine 116, and/or other engines.

In various embodiments, the access engine 112 is configured to access multiple sets of data. The multiple sets of data may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system through a network). Multiple sets of data may be contained within a single file or contained across multiple files. Multiple sets of data may be organized separately or together.

Multiple sets of data may represent multiple dimensions of an entity and/or other information. An entity may refer to an individual, a group of individuals, a company, a group of companies, an organization, a group of organizations, a city, a state, a country, a continent, and/or other individual or grouping of living and/or non-living things. Dimensions of an entity may refer to characteristics or properties of the entity (or particular aspects of the entity), qualities or quantities that describes the entity (or particular aspects of the entity), and/or other information that defines or classifies the entity (or particular aspects of the entity).

For example, an entity may refer to a company or a grouping of companies, and the dimensions of the entity may refer to parameters of the company or grouping of companies used to evaluate performance, status, condition, and/or other information about the company or grouping of companies. For example, dimensions of the entity may include or be used to evaluate the entity's sales, profitability, market share, market ranking, price/earnings ratio, market cap, stock volume, stock price, and/or other information. Dimensions of the entity may refer to information that may be used to indirectly assess characteristics or properties of the entity, qualities or quantities that describe the entity, and/or other information that defines or classifies the entity. For example, dimensions of a company and/or grouping of companies may include information about condition and/or information used to evaluate the condition of the market in which the company and/or grouping of companies are involved. Other types of entities and dimensions of entities are contemplated.

In various embodiments, the conversion engine 114 is configured to convert the multiple sets of data for plotting within one or more multidimensional arc charts. The conversion engine 114 may correlate different sets of data with different dimensions of the entity. The conversion engine 114 may assign different sets of data to different sections within the multidimensional arc chart(s). The conversion engine 114 may convert one or more units of the different sets of data for plotting within the multidimensional arc chart(s). The conversion engine 114 may determine values of the sets of data that correspond to different axes of the multidimensional arc chart.

A multidimensional arc chart may be defined by a rounded outer shape. In some embodiments, the rounded outer shape of the first multidimensional arc chart may be a circular shape. Other rounded shapes are contemplated. The rounded outer shape may be characterized by an arc length.

A multidimensional arc chart may be divided into multiple sections. Individual sections may include a plot of a dimension of one or more entities. Values of individual plots may be determined based on corresponding positions along the arc length. In some embodiments, positions along the arc length may represent different points in time (e.g., measured in seconds, minutes, hours, days, weeks, months, etc.).

In some embodiments, multiple sections of a multidimensional arc chart may include a same vertical axis. For example, a multidimensional arc chart may include four sections and the vertical axis of two or more sections may have the same scale (represent the same amount of values). In some embodiments, multiple sections of a multidimensional arc chart may include different vertical axes. For example, a multidimensional arc chart may include five sections and the vertical axis of two or more sections may have different scales (represent different amounts of values).

In some embodiments, a multidimensional arc chart may plot multiple dimensions of an entity in real time. The multiple sets of data representing multiple dimensions of the entity may be streamed and the multidimensional arc chart may plot the streamed data. The multidimensional arc chart may plot multiple dimensions of the entity for a certain duration of time. For example, individual sections of the multidimensional arc chart may plot individual dimensions of an entity for a set amount of time (e.g., one hour). The values of the plot older than the set amount of time may disappear from the individual sections of the multidimensional arc chart.

In some embodiments, a multidimensional arc chart may plot multiple dimensions of an entity for a range of time. A range of time may include time duration for which data representing multiple dimensions of the entity is available or a portion of such time. For example, the multiple sets of data representing multiple dimensions of the entity may include data for a duration of time (e.g., a month). The multidimensional arc chart may plot multiple dimensions of the entity for the entire duration of time that the data is available (e.g., a month) or a portion of such time (e.g., a week).

In various embodiments, the interface engine 116 is configured to provide one or more interfaces that includes one or more multidimensional arc charts. The interface engine 116 may present the interface(s) as part of a workflow for visualizing one or more entities and/or dimensions of one or more entities. In various embodiments, the interface(s) may be accessed through a software application running on a computing device (e.g., computers, mobile phones, tablets, etc.) that includes one or more processors and memory. For example, the interface(s) may be accessible through a web browser. In another example, the interface(s) may be provided through a data analysis application. In yet another example, the interface(s) may be provided as a service over a network (e.g., software as a service). Depending on the computing device, the user may be able to interact with the interface(s) using various input devices (e.g., keyboard, mouse, etc.) and/or touch gestures. In some embodiments, the application (e.g., web browser, data analysis application, etc.) or computing device through which the interface(s) are accessed may be configured to utilize various data processing engines and/or techniques to enable functionalities described in reference to the interface(s).

The interface(s) may enable a user to view particular information regarding one or more entities and/or dimensions of one or more entities. For example, a user may click-on and/or hover a cursor over a particular portion of the plot within a multidimensional arc chart to view information about the particular dimension represented by the plot. For example, responsive to a user click or hover over a certain location on a plot, the interface may present an information box that displays information regarding (1) the type or identifier of the dimension, (2) value of the dimension corresponding to the location on the plot, (3) time corresponding to the location on the plot, and/or other information. In some embodiments, an interface may include multiple multidimensional arc charts (plotting multiple dimensions of different entities, plotting multiple dimensions of a same entity), and responsive to a user click or hover over a certain location on a plot of one multidimensional arc charts, the interface may present information boxes for each multidimensional arc charts including information about different dimensions at the corresponding location. In some embodiments, an interface may present information regarding a current time (e.g., timestamp) or a time corresponding to the plots presented in a multidimensional arc chart.

The interface(s) may enable a user to change one or more aspects of the multidimensional arc chart(s). For example, the interface may enable a user to (1) change one or more vertical axes of a multidimensional arc chart, (2) change an inner radius of a multidimensional arc chart, (3) change the representation of arc length (e.g., amount represented by a certain arc length, type of value represented by arc length), (4) change plotting of a multidimensional arc chart in real time or not, (5) change a range of time of data presented in a multidimensional arc chart, (6) change the dimension(s) plotted within a multidimensional arc chart, (7) play, pause, rewind, and/or fast forward the plotting of one or more dimensions of an entity within a multidimensional arc chart, and/or change other aspects of the multidimensional arc chart(s).

FIGS. 2, 3A-3B, and 4 illustrate example multidimensional arc charts, in accordance with various embodiments. In some embodiments, multidimensional arc chart(s) may be included in interface(s) accessed as part of a workflow for visualizing one or more entities and/or dimensions of one or more entities. In various embodiments, the multidimensional arc chart(s) may be accessed through a software application running on a computing device (e.g., computers, mobile phones, tablets, etc.) that includes one or more processors and memory. For example, the multidimensional arc chart(s) may be accessible through a web browser. In another example, the multidimensional arc chart(s) may be provided through a data analysis application. In yet another example, the multidimensional arc chart(s) may be provided as a service over a network (e.g., software as a service). Depending on the computing device, the user may be able to interact with the multidimensional arc chart(s) using various input devices (e.g., keyboard, mouse, etc.) and/or touch gestures. In some embodiments, the application (e.g., web browser, data analysis application, etc.) or computing device through which the multidimensional arc chart(s) are accessed may be configured to utilize various data processing engines and/or techniques to enable functionalities described in reference to the multidimensional arc chart(s). These multidimensional arc charts are provided merely as examples and, naturally, the arrangement and configuration of such multidimensional arc chart may vary depending on the implementation. Thus, depending on the implementation, the multidimensional arc charts may include additional features and/or alternative features.

Figure 2:
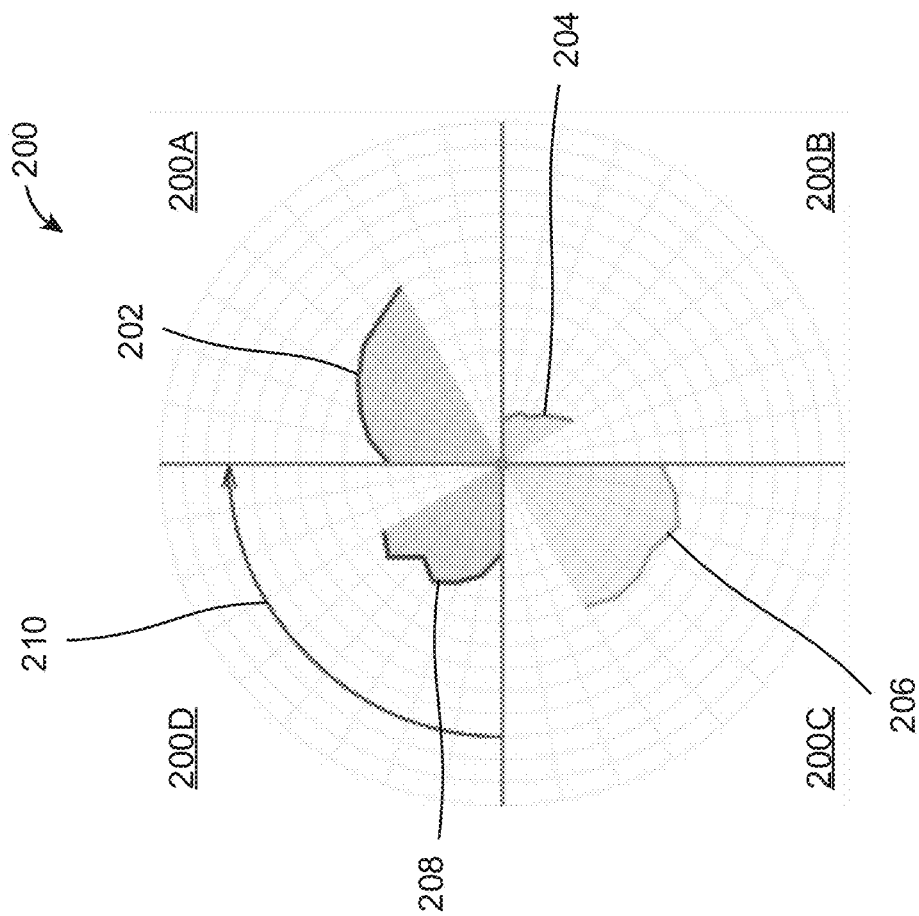
FIG. 2 illustrates an example multidimensional arc chart, in accordance with various embodiments.

FIG. 2 illustrates an example multidimensional arc chart 200. In some embodiments, the multidimensional arc chart 200 may be included in an interface presented through a display screen of a computing device. Further, the multidimensional arc chart 200 may be provided through an application (e.g., web browser, data analysis application, etc.) running on the computing device. In some embodiments, the application and/or computing device through which the multidimensional arc chart 200 is accessed may be configured to utilize various data processing engines and/or techniques to enable the functionality described in reference to the multidimensional arc chart 200.

As shown the multidimensional arc chart 200 may be defined by a rounded (e.g., circular) outer shape. The rounded outer shape may be characterized by an arc length (e.g., circumference of the circle). The multidimensional arc chart 200 may be divided into multiple sections 200A, 200B, 200C, 200D. Individual sections 200A, 200B, 200C, 200D may include a plot of a dimension of one or more entities. For example, the section 200A may include a plot 202 of a first dimension of an entity. The section 200B may include a plot 204 of a second dimension of the entity. The section 200C may include a plot 206 of a third dimension of the entity. The section 200D may include a plot 208 of a fourth dimension of the entity. In some embodiments, the individual sections 200A, 200B, 200C, 200D may include a plot of a same type of dimensions of different entities (e.g., plot of profits of different companies are shown within a single multidimensional arc chart).

In some embodiments, the multidimensional arc chart 200 may be plotted in a clockwise direction as shown by an arrow 210. In some embodiments, the multidimensional arc chart 200 may be plotted in a counter-clockwise direction or other directions. Values of individual plots 202, 204, 206, 208 along the vertical axis of individual sections 200A, 200B, 200C, 200D may be determined based on corresponding positions along the arc length (in the individual sections 200A, 200B, 200C, 200D) of the multidimensional arc chart 200. In some embodiments, positions along the arc length may represent different points in time (e.g., measured in seconds, minutes, hours, days, weeks, months, etc.). Other representations based on positions along the arc length are contemplated.

In some embodiments, multiple sections 200A, 200B, 200C, 200D of the multidimensional arc chart 200 may include a same vertical axis. For example, the vertical axis of two or more sections 200A, 200B, 200C, 200D may have the same scale (represent the same amount of values). In some embodiments, multiple sections 200A, 200B, 200C, 200D of the multidimensional arc chart 200 may include different vertical axes. For example, the vertical axis of two or more sections 200A, 200B, 200C, 200D may have different scales (represent different amounts of values). Providing for independent vertical axes in multiple sections 200A, 200B, 200C, 200D may enable a user to plot dimensions at scales that are meaningful for analysis.

In some embodiments, the multidimensional arc chart 200 may plot multiple dimensions of an entity in real time. The multiple sets of data representing multiple dimensions of the entity may be streamed and the multidimensional arc chart 200 may plot the streamed data. In some embodiments, the multidimensional arc chart 200 may plot multiple dimensions of the entity for a certain duration of time. For example, individual sections 200A, 200B, 200C, 200D of the multidimensional arc chart 200 may plot individual dimensions of an entity for a set amount of time (e.g., one hour). The values of the plot older than the set amount of time may disappear from the individual sections 200A, 200B, 200C, 200D of the multidimensional arc chart 200 (e.g., pushed out of the individual sections 200A, 200B, 200C, 200D).

In some embodiments, the multidimensional arc chart 200 may plot multiple dimensions of an entity for a range of time. A range of time may include time duration for which data representing multiple dimensions of the entity is available or a portion of such time. For example, the multiple sets of data representing multiple dimensions of the entity may include data for a duration of time (e.g., a month). The multidimensional arc chart 200 may plot multiple dimensions of the entity for the entire duration of time that the data is available (e.g., a month) or a portion of such time (e.g., a week). In some embodiments, the multidimensional arc chart 200 may be accompanied by information regarding a current time/time corresponding to the plots 200A, 200B, 200C, 200D (e.g., timestamp).

In some implementations, a user may change the range of time presented in the individual sections 200A, 200B, 200C, 200D of the multidimensional arc chart 200. For example, a user may change the range of time presented in the individual sections 200A, 200B, 200C, 200D via an option box and/or by interacting with the multidimensional arc chart 200. For example, a user may click on a portion of the plot(s) or multidimensional arc chart 200 to pan the plot(s) or multidimensional arc chart 200 and/or may use a mouse-wheel to zoom in and out of different ranges of time.

A user may interact with the multidimensional arc chart 200 to view particular information regarding one or more entities and/or dimensions of one or more entities. For example, a user may click-on and/or hover a cursor over a particular portion of the plot 202, 204, 206, 208 within the multidimensional arc chart 200 to view information about the particular dimension represented by the plot 202, 204, 206, 208. For example, responsive to a user click or hover over a certain location on a plot 202, 204, 206, 208, the interface may present an information box that displays information regarding (1) the type or identifier of the dimension corresponding to the plot 202, 204, 206, 208, (2) value of the dimension corresponding to the location on the plot 202, 204, 206, 208, (3) time corresponding to the location on the plot 202, 204, 206, 208, and/or other information. In some implementations, the type of information displayed in the information box may be changed based on user selection. For example, a user may choose to add or remove a type of information displayed in the information box. In some implementations, the type of information displayed in the information box may depend on the particular dimension corresponding to the plot 202, 204, 206, 208.

A user may change one or more aspects of a multidimensional arc chart. For example, a user may interact with a multidimensional arc chart and/or use one or more options boxes to (1) change one or more vertical axes of a multidimensional arc chart, (2) change an inner radius of a multidimensional arc chart, (3) change the representation of arc length (e.g., amount represented by a certain arc length, type of value represented by arc length), (4) change plotting of a multidimensional arc chart in real time or not, (5) change a range of time of data presented in a multidimensional arc chart, (6) change the dimension(s) plotted within a multidimensional arc chart, (7) play, pause, rewind, and/or fast forward the plotting of one or more dimensions of an entity within a multidimensional arc chart, and/or change other aspects of the multidimensional arc chart(s).

Figure 3B:
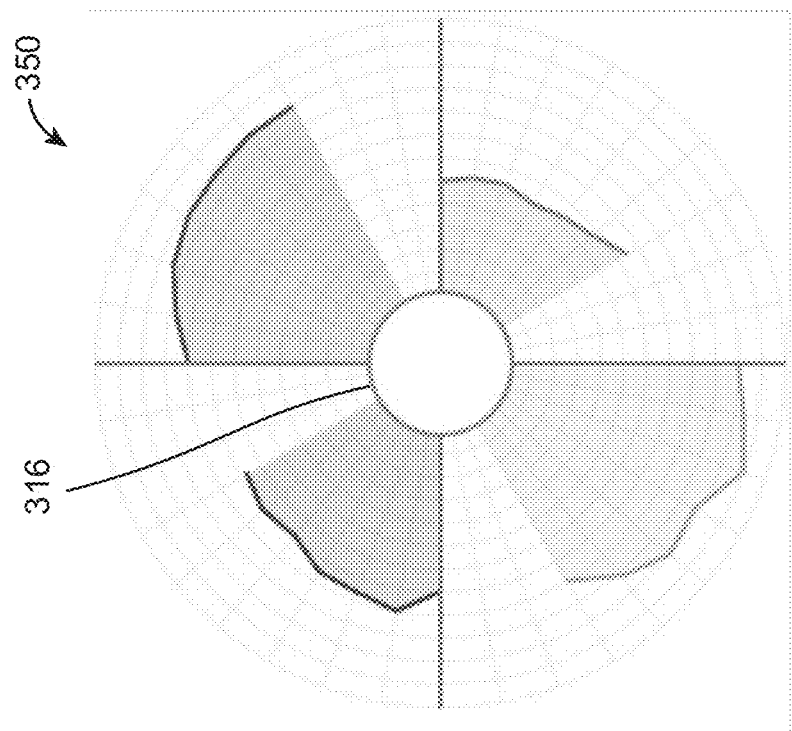
FIGS. 3A-3B illustrate example changes in the multidimensional arc chart shown in FIG. 2.
Figure 3A:
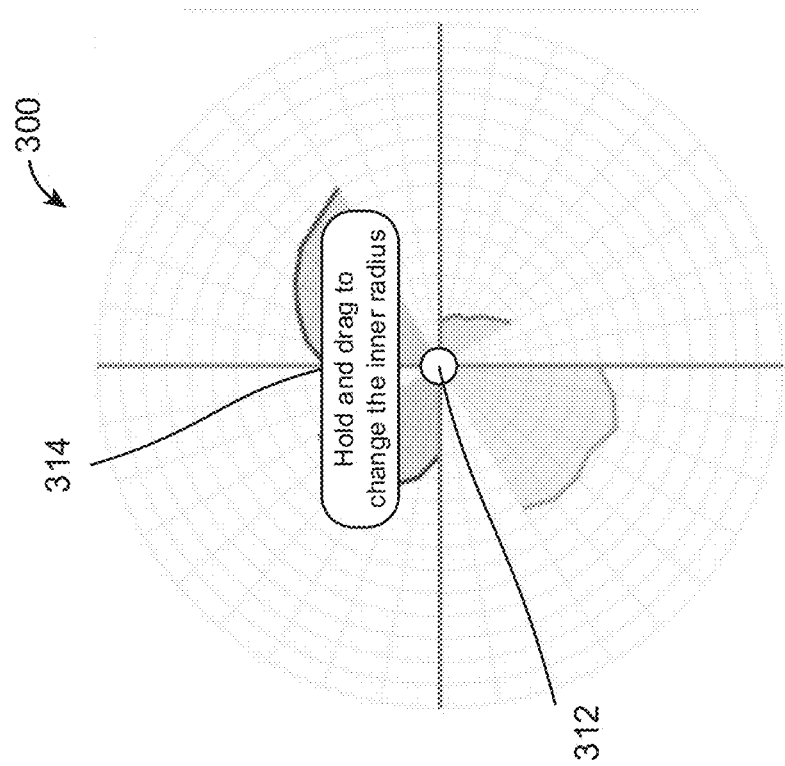

For example, FIGS. 3A-3B illustrate example multidimensional arc chart 300, 350. In some embodiments, the multidimensional arc chart 300, 350 may be included in an interface presented through a display screen of a computing device. Further, the multidimensional arc chart 300, 350 may be provided through an application (e.g., web browser, data analysis application, etc.) running on the computing device. In some embodiments, the application or computing device through which the multidimensional arc chart 300, 350 is accessed may be configured to utilize various data processing engines and/or techniques to enable the functionality described in reference to the multidimensional arc chart 300, 350. In some embodiments, the multidimensional arc chart 300, 350 may be configured to implement some, or all, of the functionalities of the multidimensional arc chart 200 as described above.

As shown in FIGS. 3A-3B, a user may change the inner radius of the multidimensional arc chart 300 to transform the multidimensional art chart 300 into the multidimensional arc chart 350. A user may change the inner radius of the multidimensional arc chart 300 by interacting with the multidimensional arc chart 300 and/or use one or more options boxes. For example, an options box may allow the user to select or specify the radius of the multidimensional arc chart 300. As another example, a user may interact with the multidimensional arc chart 300 by clicking and/or hovering a cursor close at a particular portion (e.g., near center) of the multidimensional arc chart 300. Responsive to the user's clicking and/or hovering a cursor near the center of the multidimensional arc chart 300, a circle 312 and an information box 314 (e.g., tooltip) may be displayed. The information box 314 may provide an instruction to "Hold and drag to change the inner radius." Responsive to a user's holding and dragging the circle 312, the multidimensional arc chart 300 may be changed, updated, and/or transitioned into multidimensional arc chart 350. Changing the inner radius of a multidimensional arc chart may enable a user to better visualize plots that are close to the center of the multidimensional arc chart.

In some embodiments, multiple multidimensional arc charts (plotting multiple dimensions of different entities, plotting multiple dimensions of a same entity) may be shown together. Such a showing may facilitate comparison of multiple dimensions of different entities and/or same entity at the same time. Multiple dimensions may be compared based on the size of the plots (e.g., higher or lower surface area of the plots), providing for a more efficient method of comparing dimensions than reading values of plots along axes.

Figure 4:
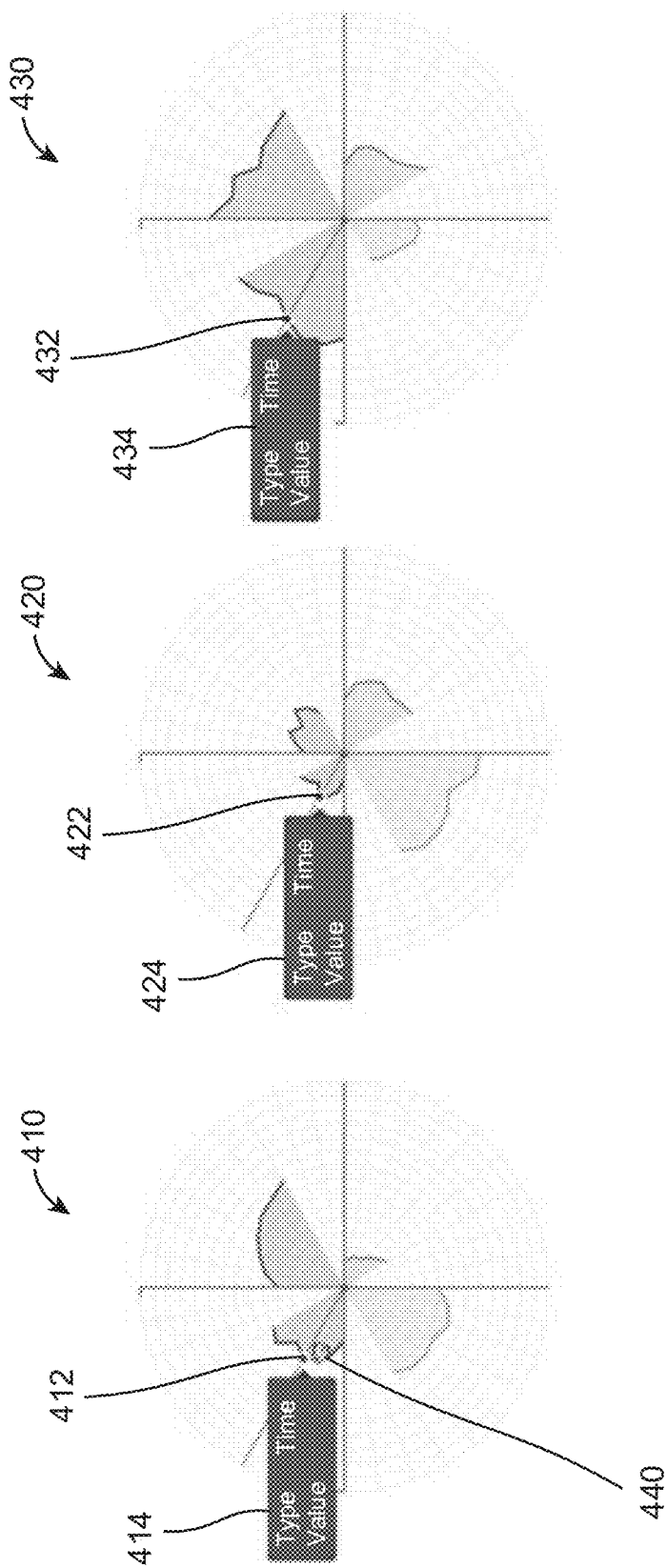
FIG. 4 illustrates example comparisons of multidimensional arc charts, in accordance with various embodiments.

For example, FIG. 4 illustrates example multidimensional arc charts 410, 420, 430. In some embodiments, the multidimensional arc charts 410, 420, 430 may be included in an interface presented through a display screen of a computing device. Further, the multidimensional arc charts 410, 420, 430 may be provided through an application (e.g., web browser, data analysis application, etc.) running on the computing device. In some embodiments, the application or computing device through which the multidimensional arc charts 410, 420, 430 are accessed may be configured to utilize various data processing engines and/or techniques to enable the functionality described in reference to the multidimensional arc charts 410, 420, 430. In some embodiments, the multidimensional arc charts 410, 420, 430 may be configured to implement some, or all, of the functionalities of the multidimensional arc chart 200 and/or the multidimensional arc chart 200, 300 as described above.

As shown in FIG. 4, responsive to a user's click and/or hover 440 over a certain location (location 412) on a plot of multidimensional arc chart 410, information boxes 414, 424, 434 may be presented for each multidimensional arc charts 410, 420, 430. The information boxes 414, 424, 414 may including information about different dimensions at the corresponding location (location 412, location 422, location 432). The information boxes 414, 424, 434 may display information regarding (1) the type or identifier of the dimension corresponding to the corresponding plot within the multidimensional arc charts 410, 420, 430, (2) value of the dimension corresponding to the locations 412, 422, 432 on the plots, (3) time corresponding to the locations 412, 422, 432 on the plots and/or other information. In some implementations, the type of information displayed in one or more of the information boxes 414, 424, 434 may be changed based on user selection. For example, a user may choose to add or remove a type of information displayed in the information boxes 414, 424, 434. In some implementations, the type of information displayed in the information box may depend on the particular dimension of the corresponding plots within the multidimensional arc charts 410, 420, 430.

Figure 5:
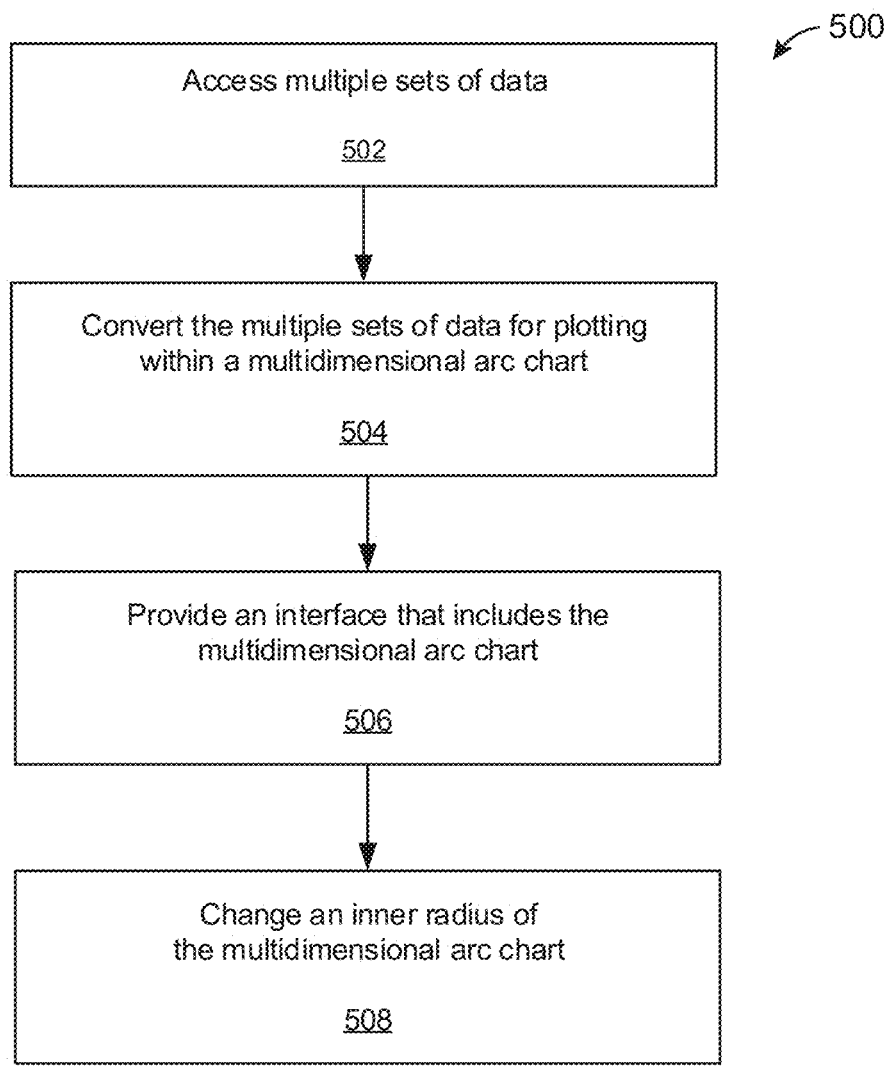
FIG. 5 illustrates a flowchart of an example method for providing an interface, in accordance with various embodiments.

FIG. 5 illustrates a flowchart of an example method 500 for providing an interface, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, multiple sets of data may be accessed. The multiple sets of data may represent multiple dimensions of an entity. At block 504, the multiple sets of data may be converted for plotting within a multidimensional arc chart. At block 506, an interface including the multidimensional arc chart may be provided. The multidimensional arc chart may be defined by a rounded outer shape. The rounded outer shape may be characterized by an arc length. The multidimensional arc chart may be divided into multiple sections. The individual sections may include a plot of a dimension of the entity. Values of the plot may be determined based on corresponding positions along the arc length. At block 508, an inner radius of the multidimensional arc chart may be changed.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
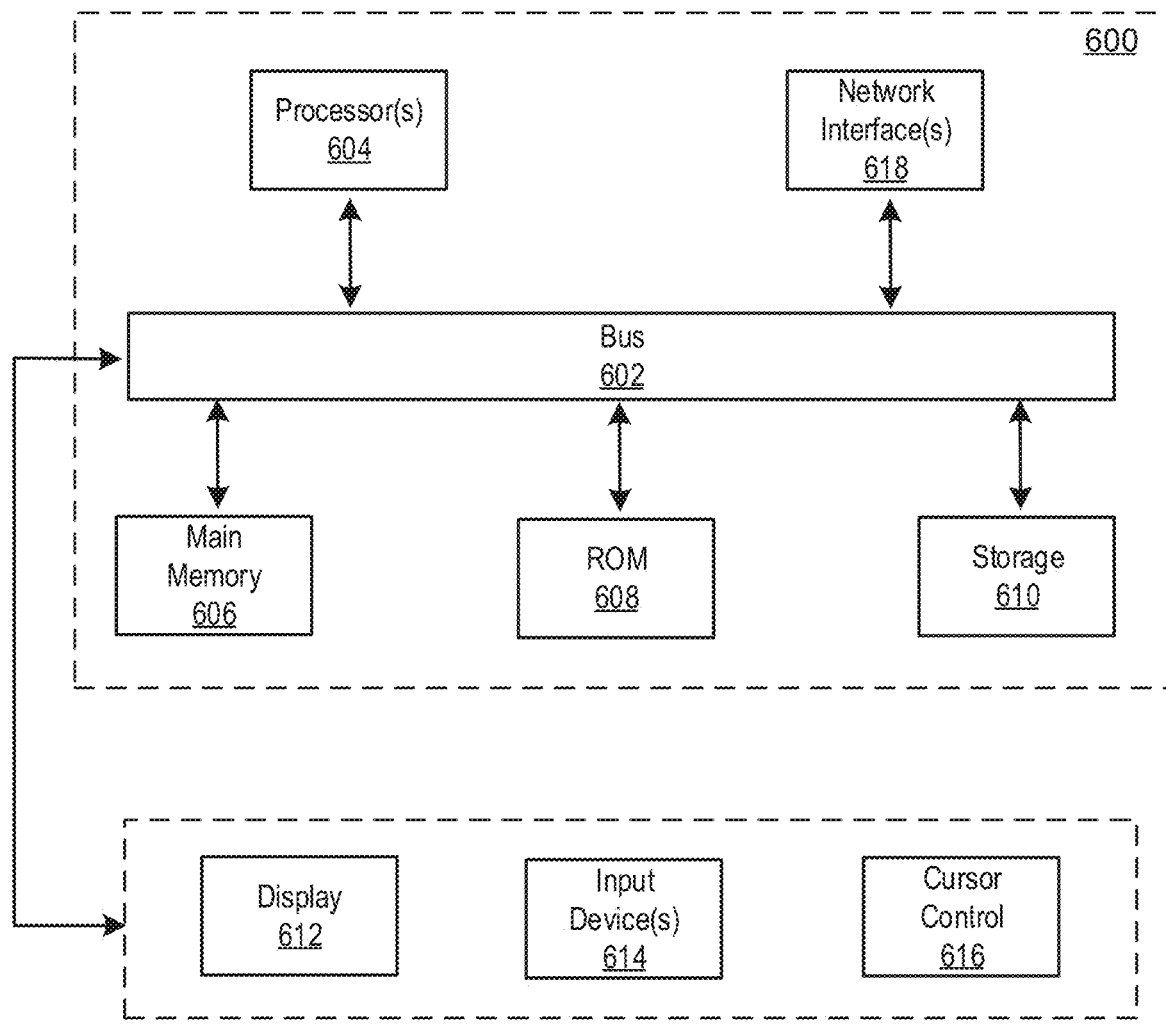
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
accessing multiple sets of data comprising at least a first set of data and a second set of data, the multiple sets of data representing multiple dimensions of a first entity, the first set of data representing a different dimension of the first entity than the second set of data;
converting the multiple sets of data for plotting within a first multidimensional arc chart, the first multidimensional arc chart being divided into multiple sections comprising at least a first section and a second section, each of the multiple sections including a respective plot of a respective dimension of the multiple dimensions of the first entity wherein the first section of the first multidimensional arc chart comprises the first set of data and the second section of the first multidimensional arc chart comprises the second set of data; and
providing an interface that includes the first multidimensional arc chart;
wherein:
the first multidimensional arc chart is defined by a rounded outer shape, the rounded outer shape characterized by an arc length; and
values of the respective plots are determined based on corresponding positions along the arc length.

2. The system of claim 1, wherein the interface includes a second multidimensional arc chart for plotting multiple dimensions of a second entity.

3. The system of claim 1, wherein the rounded outer shape is a circular shape.

4. The system of claim 1, wherein positions along the arc length represent different points in time.

5. The system of claim 1, wherein the first multidimensional arc chart plots the multiple dimensions of the first entity in real time.

6. The system of claim 1, wherein the first multidimensional arc chart plots the multiple dimensions of the first entity for a range of time.

7. The system of claim 1, wherein the memory storing instructions, when executed by the one or more processors, further cause the system to perform changing an inner radius of the first multidimensional arc chart.

8. The system of claim 1, wherein the multiple sections of the first multidimensional arc chart further comprise a third section and a fourth section, and wherein the first section and the second section comprises different vertical axes and the third section and the fourth section comprise a same vertical axis.

9. A method for providing an interface, the method being implemented by a computing system including one or more processors and storage media storing machine-readable instruction, the method comprising:
accessing multiple sets of data comprising at least a first set of data and a second set of data, the multiple sets of data representing multiple dimensions of a first entity, the first set of data representing a different dimension of the first entity than the second set of data;
converting the multiple sets of data for plotting within a first multidimensional arc chart, the first multidimensional arc chart being divided into multiple sections comprising at least a first section and a second section, each of the multiple sections including a respective plot of a respective dimension of the multiple dimensions of the first entity, wherein the first section of the first multidimensional arc chart comprises the first set of data and the second section of the first multidimensional arc chart comprises the second set of data; and
providing the interface that includes the first multidimensional arc chart;
wherein:
the first multidimensional arc chart is defined by a rounded outer shape, the rounded outer shape characterized by an arc length; and
values of the respective plots are determined based on corresponding positions along the arc length.

10. The method of claim 9, wherein the interface includes a second multidimensional arc chart for plotting multiple dimensions of a second entity.

11. The method of claim 9, wherein the rounded outer shape is a circular shape.

12. The method of claim 9, wherein the multiple sections of the first multidimensional arc chart include a same vertical axis.

13. The method of claim 9 wherein the multiple sections of the first multidimensional arc chart include different vertical axes having different number scales.

14. The method of claim 9, wherein positions along the arc length represent different points in time.

15. The method of claim 9, wherein the first multidimensional arc chart plots the multiple dimensions of the first entity in real time.

16. The method of claim 9, wherein the first multidimensional arc chart plots the multiple dimensions of the first entity for a range of time.

17. The method of claim 9, further comprising changing an inner radius of the first multidimensional arc chart.

18. A non-transitory computer readable medium comprising instruction that, when executed, cause one or more processors to perform:
accessing multiple sets of data comprising at least a first set of data and a second set of data, the multiple sets of data representing multiple dimensions of a first entity, the first set of data representing a different dimension of the first entity than the second set of data;
converting the multiple sets of data for plotting within a first multidimensional arc chart, the first multidimensional arc chart being divided into multiple sections comprising at least a first section and a second section, each of the multiple sections including a respective plot of a respective dimension of the multiple dimensions of the first entity, wherein the first section of the first multidimensional arc chart comprises the first set of data and the second section of the first multidimensional arc chart comprises the second set of data; and
providing the interface that includes the first multidimensional arc chart;
wherein:

the first multidimensional arc chart is defined by a rounded outer shape, the rounded outer shape characterized by an arc length; and values of the respective plots are determined based on corresponding positions along the arc length.

19. The non-transitory computer readable medium of claim 18, wherein the instructions, when executed, further cause the one or more processors to perform changing an inner radius of the first multidimensional arc chart.

20. The non-transitory computer readable medium of claim 18, wherein the interface includes a second multidimensional arc chart for plotting multiple dimensions of a second entity.

* * * * *